(12) United States Patent
Tsukagoshi

(10) Patent No.: US 9,578,294 B2
(45) Date of Patent: Feb. 21, 2017

(54) PROJECTOR AND METHOD FOR ADJUSTING PROJECTOR

(71) Applicant: Seiko Epson Corporation, Tokyo (JP)

(72) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 14/811,286

(22) Filed: Jul. 28, 2015

(65) Prior Publication Data

US 2016/0037145 A1  Feb. 4, 2016

(30) Foreign Application Priority Data

Aug. 1, 2014 (JP) ................................. 2014-157463

(51) Int. Cl.
*G03B 21/14* (2006.01)
*H04N 9/31* (2006.01)

(52) U.S. Cl.
CPC .......... *H04N 9/3185* (2013.01); *H04N 9/3105* (2013.01); *H04N 9/317* (2013.01); *G03B 21/147* (2013.01)

(58) Field of Classification Search
CPC ..... G03B 21/147; G03B 21/14; G03B 21/006; H04N 9/3105; H04N 9/3185; H04N 9/3188; H04N 9/3179
USPC ........ 353/69, 70, 30, 31; 348/745, 747, 746, 348/806, 807
See application file for complete search history.

(56) References Cited

U.S. PATENT DOCUMENTS 8,144,264 B2 * 3/2012 Aragaki ............... H04N 9/3105
348/745

FOREIGN PATENT DOCUMENTS

JP    2013-105170 A    5/2013

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

The projector includes a light source, a liquid crystal light valve that modulates first color component light based on a signal, a liquid crystal light valve that modulates second color component light from the light source based on a signal, a projection lens that projects a first image formed by the first color component light and a second image formed by the second color component light, an alignment image display control section that superimposes the first image and the second image on each other and projects the superimposed image to show position misregistration of the second image relative to the first image, an instruction input screen for shifting the second image as a whole, and an alignment adjustment section that determines correction information for correcting the position misregistration based on the shift instruction and corrects the signal based on the determined correction information.

6 Claims, 5 Drawing Sheets

PROJECTOR AND METHOD FOR ADJUSTING PROJECTOR

The entire disclosure of Japanese Patent Application No. 2014-157463, filed Aug. 1, 2014 is expressly incorporated by reference herein.

BACKGROUND

1. Technical Field

The present invention relates to a projector and a method for adjusting the projector.

2. Related Art

There is a widely used projector that modulates light incident on a light modulator based on an image signal and projects the modulated light to display an image. A projector of this type typically includes a light source having a lamp and a collector mirror and an illumination system that collects light outputted from the light source and causes the light to be incident on a light modulator that modulates the light incident thereon, and the light from the light modulator is projected through a projection lens or any other projection system on a screen or any other projection surface.

Among projectors of this type, in a projector that combines three primary color light fluxes, a red light flux (R), a green light flux (G), and a blue light flux (B), which have wavelengths different from one another, with one another and projects the combined light, light modulators and other optical systems are positioned with varied accuracy in some cases. When such variation occurs, in a displayed image projected on the screen, position misregistration occurs among the primary color light fluxes, undesirably resulting in color misregistration due to the position misregistration.

To avoid the situation described above, there is a proposed projector provided with an adjustment mechanism for correcting the color misregistration, as described in JP-A-2013-105170. To correct the color misregistration in the projector, a user checks an adjustment screen, specifies points at the four corners or arbitrary points on a displayed image, and adjusts the position misregistration at each of the specified points to correct the color misregistration.

However, when overall misregistration occurs uniformly among displayed images, it is necessary to specify points at the four corners or arbitrary points on the displayed images and set the amount of correction at each of the points in such a way that the amount of correction for the displayed images is uniform thereacross, which means that the setting requires a large amount of effort and time.

SUMMARY

An advantage of some aspects of the invention is to readily correct misregistration that occurs among displayed images produced by modulating light fluxes having wavelength different from one another.

The invention can be implemented as the following forms or application examples.

APPLICATION EXAMPLE 1

A projector according to this application example includes a light source section that outputs light, a first light modulation section that modulates first color component light out of the light outputted from the light source section based on a first image signal, a second light modulation section that modulates second color component light out of the light outputted from the light source section based on a second image signal, a projection section that projects a first image corresponding to the light modulated by the first light modulation section and a second image corresponding to the light modulated by the second light modulation section, a display control section that superimposes the first image and the second image on each other and projects a superimposed image to show position misregistration of the second image relative to the first image, an accepting section that accepts shift instruction to shift the second image relative to the first image, and an alignment adjustment section that determines correction information for correcting the position misregistration based on the shift instruction accepted by the accepting section and corrects the second image signal based on the determined correction information, and the accepting section accepts the shift instruction via a first instruction input screen for shifting the second image as a whole and a second instruction input screen for shifting a predetermined portion of the second image.

According to the configuration described above, since the first image corresponding to the light modulated by the first light modulation section and the second image corresponding to the light modulated by the second light modulation section are superimposed on each other and then projected, shift instruction is accepted via the first instruction input screen for shifting the second image as a whole and the second instruction input screen for shifting a predetermined portion of the second image while position misregistration of the second image relative to the first image is visually recognized, and correction information for correcting the position misregistration is determined based on the accepted shift instruction, followed by correction of the second image signal based on the determined correction information. Therefore, the second image can be shifted as a whole via the first instruction input screen and a predetermined portion of the second image can be shifted via the second instruction input screen in accordance with the position misregistration of the second image relative to the first image, whereby position misregistration between the images corresponding to the modulated light fluxes can be readily corrected.

APPLICATION EXAMPLE 2

In the projector according to the application example described above, it is preferable that the accepting section accepts the shift instruction issued via the first instruction input screen before the shift instruction issued via the second instruction input screen.

According to the configuration described above, since the second image is shifted as a whole, and a predetermined portion of the second image is then shifted, precise misregistration correction is readily instructed because uniform misregistration in the second image is first corrected.

APPLICATION EXAMPLE 3

In the projector according to the application example described above, it is preferable that, when the accepting section accepts the shift instruction via the first instruction input screen, the alignment adjustment section shifts the second image by the same amount of shift in accordance with the shift instruction or offsets data on the second image in accordance with the shift instruction and reads the offset data.

According to the configuration described above, the second image is shifted by the same amount of shift or data on the second image is offset and read. One of the two methods described above can be used to shift the second image as a whole.

APPLICATION EXAMPLE 4

In the projector according to the application example described above, it is preferable that the second instruction input screen accepts at least one of the shift instruction to shift a plurality of end portions of the second image and the shift instruction to shift an arbitrary portion of the second image.

According to the configuration described above, the second instruction input screen allows at least one of end portions of the second image and an arbitrary portion of the second image to be shifted.

APPLICATION EXAMPLE 5

A method for adjusting a projector according to this application example is a method for adjusting a projector including a light source section, a first light modulation section that modulates first color component light out of light outputted from the light source section based on a first image signal, a second light modulation section that modulates second color component light out of the light outputted from the light source section based on a second image signal, and a projection section that projects a first image corresponding to the light modulated by the first light modulation section and a second image corresponding to the light modulated by the second light modulation section, the method including superimposing the first image and the second image on each other and projecting the superimposed image to show position misregistration of the second image relative to the first image, accepting shift instruction via a first instruction input screen for shifting the second image as a whole relative to the first image, accepting the shift instruction via a second instruction input screen for shifting a predetermined portion of the second image, and determining correction information for correcting the position misregistration based on the shift instruction and storing the determined correction information.

According to the method described above, since the first image corresponding to the light modulated by the first light modulation section and the second image corresponding to the light modulated by the second light modulation section are superimposed on each other and then projected, shift instruction is accepted via at least one of the first instruction input screen for shifting the second image as a whole and the second instruction input screen for shifting a predetermined portion of the second image while position misregistration of the second image relative to the first image is visually recognized, and correction information for correcting the position misregistration is determined based on the accepted shift instruction and stored, followed by correction of the second image signal based on the stored correction information. Therefore, the second image can be shifted as a whole via the first instruction input screen and a predetermined portion of the second image can be shifted via the second instruction input screen in accordance with the position misregistration of the second image relative to the first image, whereby the position misregistration between the images corresponding to the modulated light fluxes can be readily corrected.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Embodiment

Functional Configuration of Projector

Figure 1:
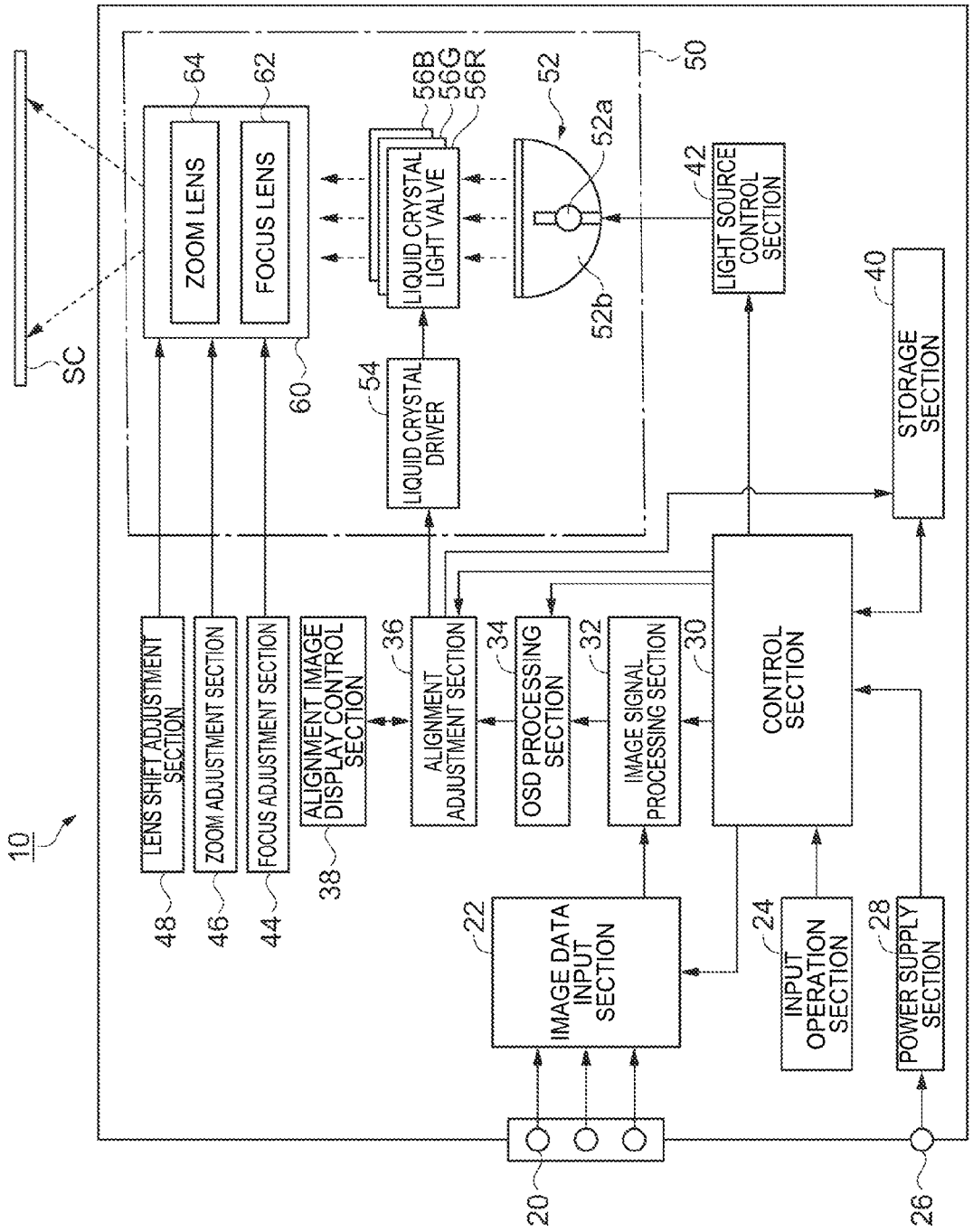
FIG. 1 is a block diagram showing a functional configuration of a projector according to an embodiment of the invention.

FIG. 1 is a block diagram showing a functional configuration of a projector 10 according to the present embodiment. The projector 10 includes image input terminals 20, an image data input section 22, an input operation section 24, a power terminal 26, a power supply section 28, a control section 30, an image signal processing section 32, an OSD processing section 34, an alignment adjustment section 36, an alignment image display control section 38, a storage section 40, a light source control section 42, a focus adjustment section 44, a zoom adjustment section 46, a lens shift adjustment section 48, and an image projection section 50. These components are accommodated in an enclosure that is not shown but is part of the projector 10 or disposed on the outer surface of the enclosure.

The image projection section 50 includes a light source 52, three liquid crystal light valves 56R, 56G, and 56B as light modulators, a projection lens 60 as a projection system, a liquid crystal driver 54, and other components. In the image projection section 50, the liquid crystal light valves 56R, 56G, and 56B modulate light outputted from the light source 52, and the projection lens 60 projects the modulated light fluxes to display images on a screen SC or any other surface. In the present embodiment, the liquid crystal light valve 56R corresponds to a first light modulation section, and each of the liquid crystal light valves 56G and 56B corresponds to second light modulation section.

The light source 52 includes a discharge-type light source lamp 52a, which is formed, for example, of an ultrahigh-pressure mercury lamp or a metal halide lamp, and a reflector 52b, which reflects light emitted from the light source lamp 52a toward the liquid crystal light valves 56R, 56G, and 56B. The light source 52 corresponds to a light source section.

The light outputted from the light source 52 is converted by an optical integration system (not shown) into light having a roughly uniform luminance distribution, and the resultant light is separated by a color separation system (not shown) into color light components of red (R), green (G), and blue (B), which are the three primary colors of light. The R, G, and B color light components are then incident on the liquid crystal light valves 56R, 56G, and 56B, respectively.

Each of the liquid crystal light valves 56R, 56G, and 56B is formed, for example, of a liquid crystal panel in which a liquid crystal material is sealed between a pair of transparent substrates. Each of the liquid crystal light valves 56R, 56G, and 56B has a plurality of pixels (not shown) arranged therein in a matrix, and a drive voltage is applicable to the liquid crystal material on a pixel basis.

The liquid crystal driver 54 applies a drive voltage according to an inputted image signal to each of the pixels.

As a result, the optical transmittance of the pixel is set in accordance with the image signal. The light outputted from the light source 52 is therefore modulated when passing through the liquid crystal light valves 56R, 56G, and 56B, whereby image light according to the image signal is formed on a color light flux basis.

The thus formed color image light fluxes are combined with one another on a pixel basis by a light combining system (not shown) to form color image light, which is then enlarged and projected by the projection lens 60, which corresponds to a projection section, on the screen SC or any other surface.

The projection lens 60 includes a zoom lens 64 for changing the enlargement factor in accordance with which a projected image is enlarged and a focus lens 62 for bringing an image projected on the screen SC into focus.

In the present embodiment, the user operates the zoom adjustment section 46 to allow the zoom lens 64 to change the enlargement factor thereof. Further, the user operates the focus adjustment section 44 to allow the focus lens 62 to bring an image into focus.

Further, the user operates the lens shift adjustment section 48 to move the projection lens 60 in upward, downward, rightward, and leftward directions, which are perpendicular to the optical axis of the projection lens 60 and therefore move the position of an image projected on the screen SC in the upward, downward, rightward, and leftward directions.

In the present embodiment, the projector 1, which uses the light source lamp 52a as part of the light source 52 to perform projection, is presented by way of example, and the invention is also applicable to a projector that uses an LED (light emitting diode) light source, a laser light source, or any other light source as part of the light source to perform projection.

In the present embodiment, the image projection section 50 is a projection system based on a transmissive liquid crystal method using the three liquid crystal light valves 56R, 56G, and 56B, and a three-panel light modulator based, for example, on what is called a DLP (digital light processing) method or an LCOS method may instead be employed.

The image input terminals 20 receive image data as inputs from an external image output apparatus, such as a video reproduction apparatus and a personal computer, via a cable, a communication apparatus, or any other component neither of which is shown. The inputted image data is sent to the image data input section 22.

The image data input section 22 outputs the image data sent through any of the image input terminals 20 to the image signal processing section 32 based on an instruction from the control section 30. The following aspect is also conceivable: The image data input section 22 includes a receiver using wireless communication, optical communication, or any other type of communication, and image data is wirelessly inputted from an external apparatus.

The input operation section 24 has a plurality of operation keys (not shown) that allow the user to issue a variety of instructions to the projector 10, and the input operation section 24 comprises a main key provided on the outer surface of the enclosure (not shown) of the projector 10. It is instead conceivable to configure the input operation section 24 in the form of a wireless remote control (not shown), for example, using infrared light or an electric wave.

The image signal processing section 32 converts the image data outputted from the image data input section 22 into image signals representing the grayscales at the pixels in the liquid crystal light valves 56R, 56G, and 56B based on an instruction from the control section 30. The converted image signals correspond to the red (R), green (G), and blue (B) color light fluxes and carry a plurality of pixel values corresponding to all the pixels in the liquid crystal light valves 56R, 56G, and 56B. Each of the pixel values specifies light transmittance of the corresponding pixel and defines the intensity (grayscale) of light that passes through the pixel and exits out thereof.

The OSD processing section 34 carries out a process of superimposing a menu image, a message image, and other OSD (on-screen display) images on a projected image and displaying the resultant image based on an instruction from the control section 30. The OSD processing section 34 includes an OSD memory (not shown) that stores OSD image information representing figures, fonts, and other objects for forming an OSD image.

When the control section 30 issues an instruction to perform superimposed display in which an OSD image is superimposed on a projected image, the OSD processing section 34 reads necessary OSD image information from the OSD memory and combines a signal carrying the OSD image information with the image signal inputted from the image signal processing section 32 in such a way that the OSD image is superimposed on a projected image and in a predetermined position. The image signal combined with the OSD image information is outputted to the alignment adjustment section 36.

When the control section 30 issues no instruction to superimpose an OSD image, the OSD processing section 34 outputs the image signal inputted from the image signal processing section 32 directly to the alignment adjustment section 36.

The alignment adjustment section 36 corresponds to an alignment adjustment section, corrects the image signal in accordance with correction information stored in the storage section 40 so that the amount of position misregistration that occurs among color component images corresponding to the primary color light fluxes R, G, and B projected on the screen SC is reduced, and outputs the corrected image signals to the liquid crystal driver 54.

In the present embodiment, the correction information is preferably so set that the amount of position misregistration among the component images corresponding to the primary color light fluxes R, G, and B is reduced and hence the color component images are appropriately superimposed on one another. The alignment adjustment section 36 produces image signals containing component images corresponding to the primary color light fluxes R, G, and B with position misregistration among them corrected based on the correction information. A detailed description about the alignment adjustment based on correction information is disclosed, for example, in JP-A-2013-105170.

The alignment adjustment section 36 causes the alignment image display control section 38 to display an adjustment pattern image 70 (FIG. 2) based on the instruction from the control section 30 and prompts the user to set correction information via the adjustment pattern image 70 displayed on the screen SC. The alignment adjustment section 36 further causes the storage section 40 to store the set correction information.

The alignment image display control section 38 produces the adjustment pattern image 70 based on an instruction from the alignment adjustment section 36 and displays the produced adjustment pattern image 70 on the screen SC. In the present embodiment, the alignment image display control section 38 corresponds to a display control section. The functions of the alignment adjustment section 36 and the alignment image display control section 38 will be described later in detail.

The liquid crystal driver 54 drives the liquid crystal light valves 56R, 56G, and 56B in accordance with the image signals outputted from the alignment adjustment section 36, and the liquid crystal light valves 56R, 56G, and 56B form images according to the image signals. The images are then projected through the projection lens 60.

The control section 30 includes a CPU (central processing unit), a RAM (random access memory) used to temporarily store a variety of data and other types of information, and other components and operates in accordance with a control program (not shown) stored in the storage section 40 to oversee and control the action of the projector 10.

The storage section 40 is formed of a flash memory, a FeRAM, or any other rewritable nonvolatile memory and stores the control program for controlling the action of the projector 10, a variety of setting data for defining conditions and other factors under which the projector 10 operates, and other types of information. The storage section 40 further stores the correction information set by the alignment adjustment section 36.

The light source control section 42 supplies the light source 52 with electric power and stops supplying the electric power and turns on and off the light source 52 based on an instruction from the control section 30.

The power supply section 28 externally receives electric power, such as AC 100 V, via the power terminal 26. The power supply section 28 converts, for example, commercial power (AC power) into DC power having a predetermined voltage and supplies the components in the projector 10 with the converted electric power.

Setting Correction Information

How to set the correction information will next be described. The alignment adjustment section 36 starts the process of setting the correction information when the user selects "Liquid crystal alignment" in a menu image displayed as an OSD image on the screen SC.

The alignment adjustment section 36 has the following functions.
(1) Color combination selection function
(2) Entire adjustment function
(3) Entire adjustment mode setting function
(4) Four-point adjustment function
(5) Each-point adjustment function
(1) Color Combination Selection Function The alignment adjustment section 36 separately performs first misregistration correction on the primary color light flux R (second color component) with reference to the primary color light flux G (first color component) and second misregistration correction on the primary color light flux B (second color component) with reference to the primary color light flux G to determine the correction information. In the present embodiment, the user, when setting the correction information, is prompted to select a combination of colors to be corrected, that is, the first misregistration correction or the second misregistration correction.

(2) Entire Adjustment Function

Figure 2:
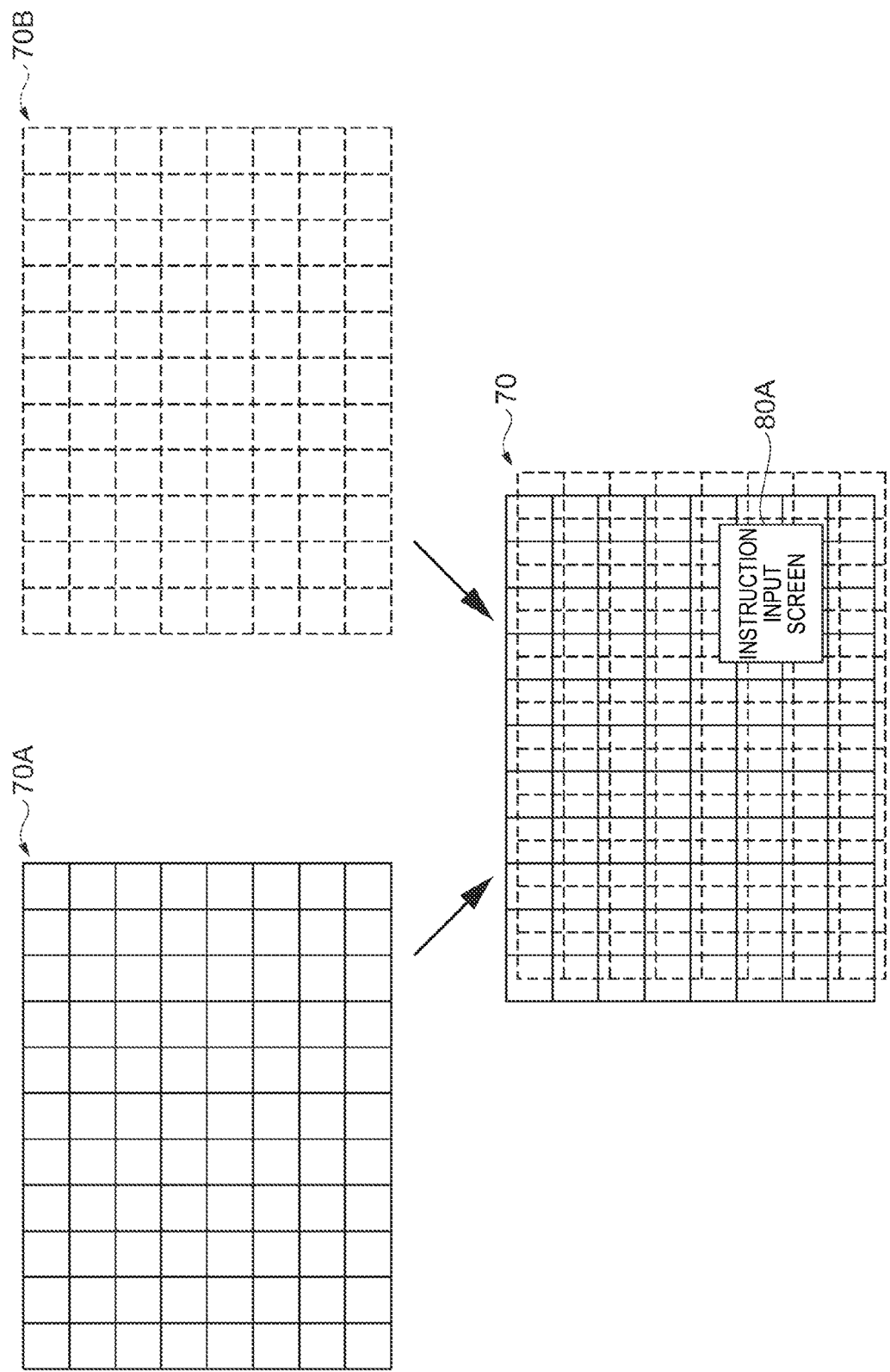
FIG. 2 describes superimposition of adjustment pattern images.

The entire adjustment is adjustment in which the position of the pattern image is entirely translated. In the present embodiment, when the first misregistration correction is selected in the color combination selection function, the alignment image display control section 38 displays the adjustment pattern image 70 formed of an adjustment pattern image 70A, which is carried by the image signal corresponding to the primary color light flux G (first image signal), and an adjustment pattern image 70B, which is carried by the image signal corresponding to the primary color light flux R (second image signal), superimposed on each other as shown in FIG. 2, on the screen SC. When position misregistration occurs between the color component images of the primary color light fluxes R and G, the adjustment pattern image 70A and the adjustment pattern image 70B do not coincide with each other but are so displayed that they are shifted from each other by the number of pixels according to the position misregistration.

Further, the alignment adjustment section 36 corresponds to an accepting section, displays an instruction input screen 80A (first instruction input screen) superimposed as an OSD image on the adjustment pattern image 70, and accepts shift instruction instructed by the user via the instruction input screen 80A.

Figure 3:
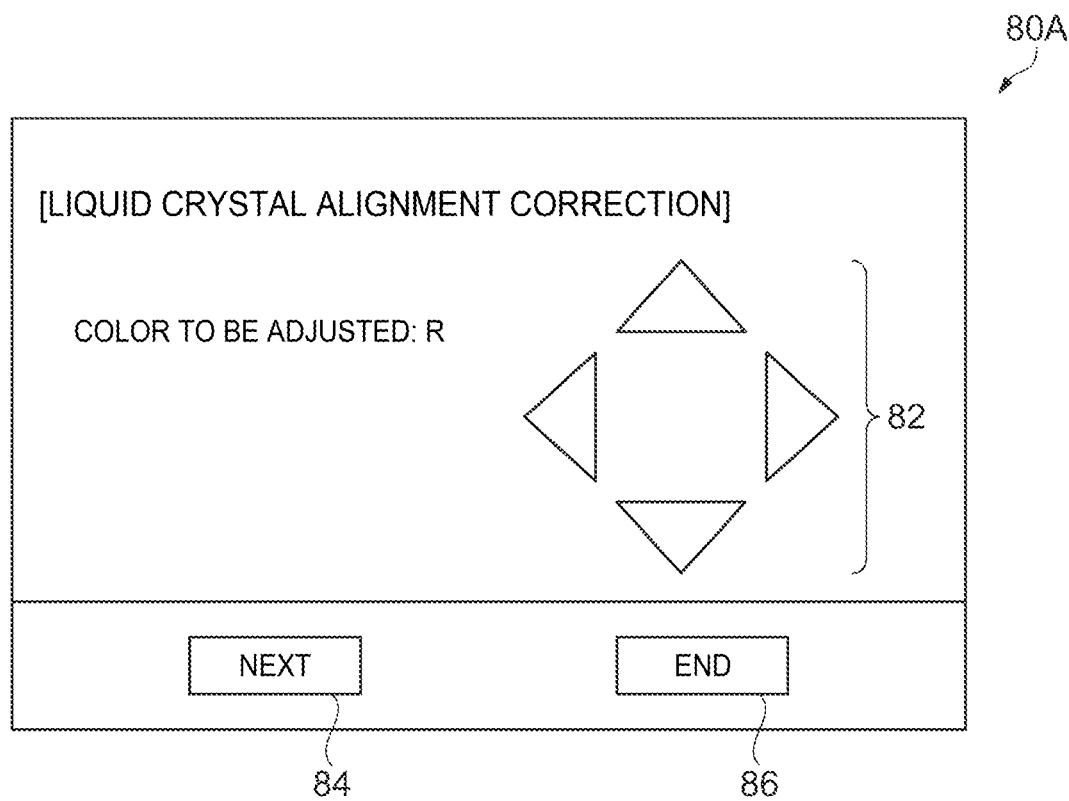
FIG. 3 describes an instruction input screen.

FIG. 3 describes the instruction input screen 80A. The user operates direction keys 82 in the instruction input screen 80A displayed on the screen SC via the input operation section 24. In the present embodiment, when any of the direction keys 82 is pressed, shift instruction is generated, and the alignment adjustment section 36 shifts the adjustment pattern image 70B in accordance with the generated shift instruction. The user can therefore reduce the amount of misregistration between the adjustment pattern image 70A and the adjustment pattern image 70B by appropriately pressing any of the direction keys 82 while visually recognizing the adjustment pattern image 70 displayed on the screen SC. The alignment adjustment section 36 determines the correction information on the primary color light component R in the first misregistration correction based on information from the direction key 82 having been so pressed that the amount of misregistration is reduced.

In the present embodiment, when the user presses a "Next" button 84 in the instruction input screen 80A, the alignment adjustment section 36 starts the process of the four-point adjustment function, and when the user presses an "End" button 86, the setting of the correction information is terminated. The adjustment based on the shift instruction issued via the instruction input screen 80A may achieve sufficient adjustment of misregistration, and no more correction may be necessary in some cases. Therefore, the projector according to the present embodiment only needs to accept shift instruction issued via the instruction input screen 80A and shift instruction issued via an instruction input screen 80B, which will be described later, and after accepting shift instruction via the instruction input screen 80A as described above, the projector may terminate the setting of the correction information before accepting shift instruction via the instruction input screen 80B.

(3) Entire Adjustment Mode Setting Function

The alignment adjustment section 36 is preferably so configured that it allows the user to select one of the following modes: a mode in which the entire adjustment is precisely performed (precise adjustment mode); and a mode in which the entire adjustment is roughly performed (rough adjustment mode). In the present embodiment, when the precise adjustment mode is selected, the alignment adjustment section 36 generates shift instruction to shift the pattern image by about ⅛ of one pixel in response to single pressing operation of any of the direction keys 82. The shift instruction instructs the same amount of shift of all intersections in the adjustment pattern image 70B. As a result, the adjustment pattern image 70B is shifted as a whole. When the rough adjustment mode is selected, the alignment adjustment section 36 offsets the address in a memory from which information on the adjustment pattern image 70B is read to shift all intersections as a whole in the adjustment pattern image 70B by one pixel at a time. The rough adjustment mode, in which the adjustment pattern image 70B is shifted by one pixel at a time, can prevent a decrease in image quality, unlike in the precise adjustment mode.

(4) Four-Point Adjustment Function

Figure 4:
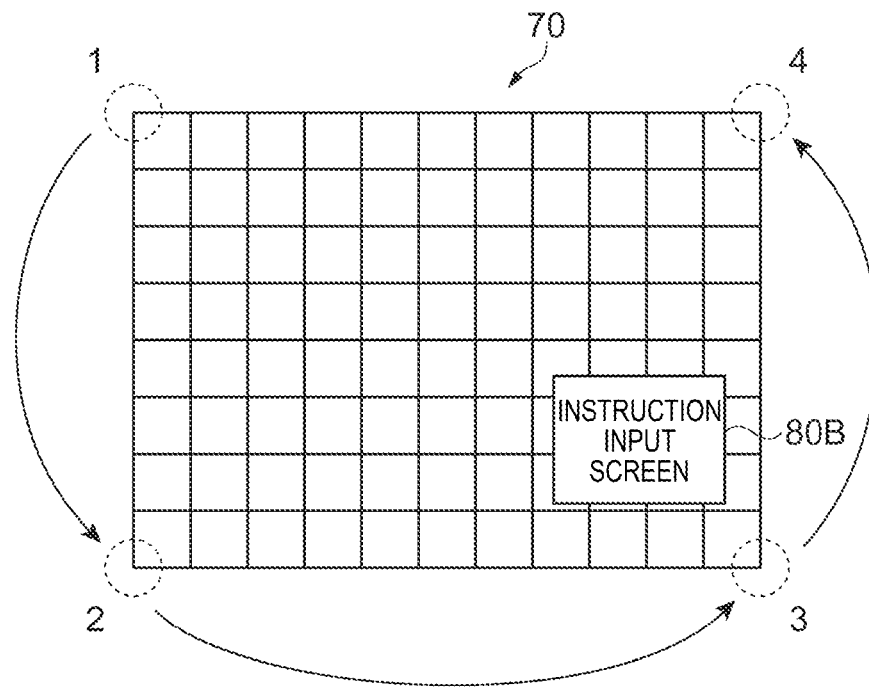
FIG. 4 describes four-point adjustment.

The four-point adjustment is an adjustment function of correcting position misregistration at a plurality of end portions, that is, the four corners in a pattern image. In the present embodiment, the alignment adjustment section 36 shows the user intersections corresponding to the four corners of the adjustment pattern image 70 sequentially in the counterclockwise direction as points to be adjusted, as shown in FIG. 4. The alignment adjustment section 36 further superimposes an instruction input screen 80B (second instruction input screen) on the adjustment pattern image 70 and in a predetermined area thereof, displays the resultant image, and shifts each of the intersections based on shift instruction instructed by the user via the instruction input screen 80B to determine the correction information. In the present embodiment, the instruction input screen 80B is the same as the instruction input screen 80A shown in FIG. 3. When the user presses the "Next" button 84, the alignment adjustment section 36 starts the process of the each-point adjustment function.

(5) Each-Point Adjustment Function

The each-point adjustment function is an adjustment function of correcting position misregistration at an arbitrary intersection in a pattern image. It is assumed that the user operates the instruction input screen 80B to specify an intersection to be adjusted and shifts the specified intersection by pressing any of the direction keys 82. In the present embodiment, when the user presses the "Next" button 84, the alignment adjustment section 36 starts the process of each-point adjustment function again.

When a series of first misregistration correction on the primary color light flux R is completed, the user performs second misregistration correction on the primary color light flux B as required.

In the four-point adjustment function and the each-point adjustment function, operation of any of the direction keys 82 does not shift all intersections as a whole. That is, the amount of shift of each intersection other than an intersection to be adjusted is determined by proportionally dividing the amount of shift of the intersection to be adjusted in accordance with the distance between the two intersections.

Further, in the present embodiment, the alignment adjustment is so set that the entire adjustment is first performed and the four-point adjustment or the each-point adjustment is then performed as required to shift a predetermined portion, but the alignment adjustment is not necessarily thus set. For example, it is conceivable that the user is prompted to select one of the entire adjustment and the four-point or each-point adjustment in the menu; and the entire adjustment is not performed but only the four-point adjustment or the each-point adjustment can be performed.

Further, the first misregistration correction and the second misregistration correction are performed with reference to the primary color light flux G, but it is conceivable to use the primary color light flux R or the primary color light flux B as the reference. Moreover, it is conceivable that the misregistration correction are not divided into the two misregistration correction modes and misregistration correction on the primary color light fluxes R, G, and B is performed at once.

Procedure of Process of Alignment Adjustment

Figure 5:
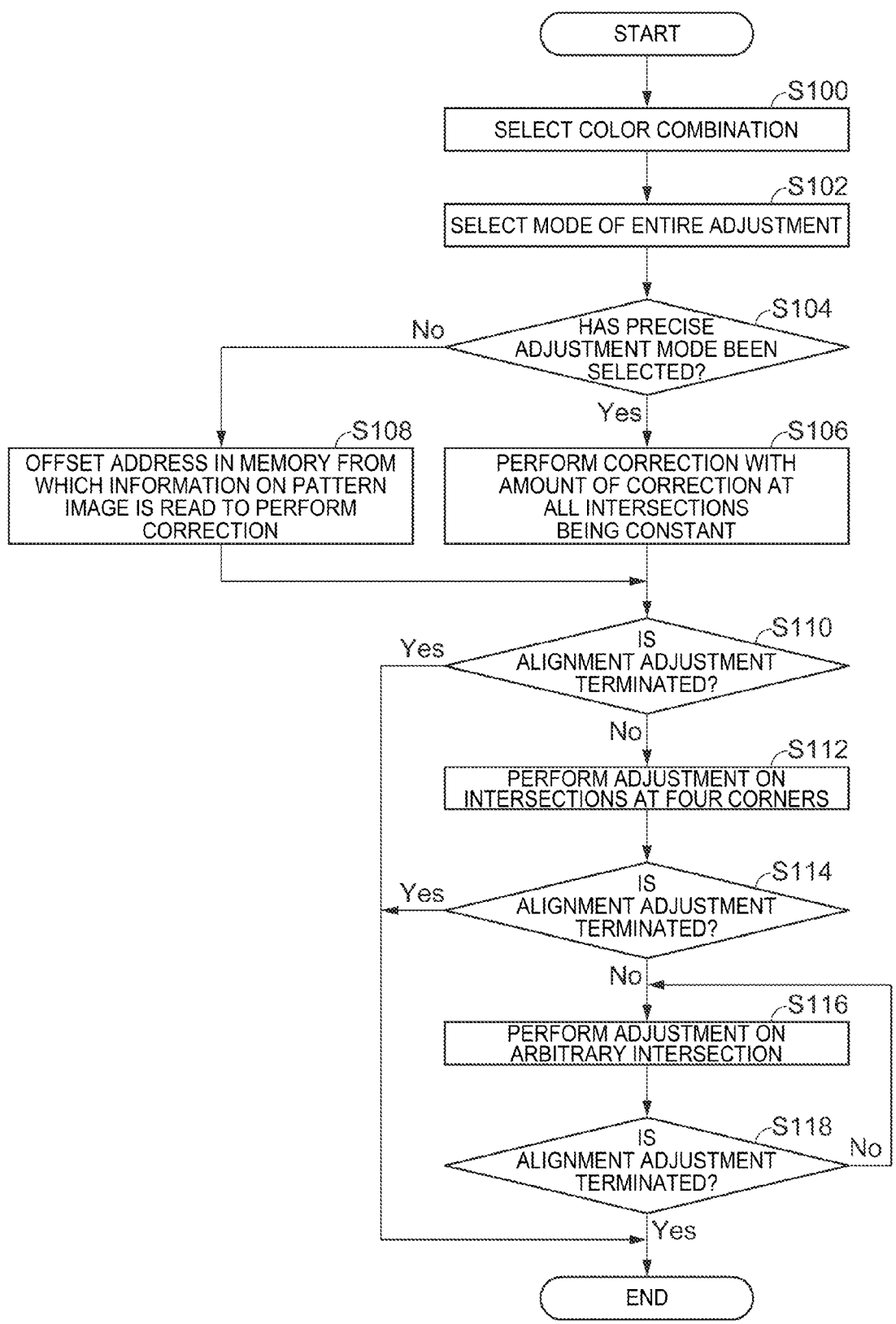
FIG. 5 is a flowchart showing the procedure of an alignment adjustment process.

FIG. 5 is a flowchart showing the procedure of the process of the alignment adjustment method performed by the projector 10.

After the process is initiated, the control section 30 prompts the user to select a color combination (step S100) and displays the adjustment pattern image 70 on the screen SC in accordance with the selected color combination <display step>.

The control section 30 then prompts the user to select one of the precise adjustment mode and the rough adjustment mode as the mode of the entire adjustment (step S102).

The control section 30 then evaluates whether or not the precise adjustment mode has been selected (step S104). When a result of the evaluation shows that the precise adjustment mode has been selected (Yes in step S104), the control section 30 performs the entire adjustment with the amount of correction at all intersections being constant in accordance with user's button operation (step S106) and proceeds to step S110 <first acceptance step>.

On the other hand, when a result of the evaluation shows that the precise adjustment mode has not been selected, that is, the rough adjustment mode has been selected (No in step S104), the control section 30 offsets the address in the memory from which information on the pattern image is read to perform the entire adjustment (step S108) and proceeds to step S110.

In step S110, the control section 30 evaluates whether or not an instruction to terminate the alignment adjustment has been issued. When a result of the evaluation shows that an instruction to terminate the alignment adjustment has been issued (Yes in step S110), the control section 30 terminates the process.

On the other hand, when a result of the evaluation shows that no instruction to terminate the alignment adjustment has been issued (No in step S110), the control section 30 performs the four-point adjustment on intersections at the four corners of the pattern image (step S112) <second acceptance step>.

The control section 30 then evaluates whether or not the instruction to terminate the alignment adjustment has been issued (step S114). When a result of the evaluation shows that the instruction to terminate the alignment adjustment has been issued (Yes in step S114), the control section 30 terminates the process.

On the other hand, when a result of the evaluation shows that no instruction to terminate the alignment adjustment has been issued (No in step S114), the control section 30 performs the each-point adjustment on an arbitrary intersection in the pattern image (step S116).

The control section 30 then evaluates whether or not the instruction to terminate the alignment adjustment has been issued (step S118). When a result of the evaluation shows that the instruction to terminate the alignment adjustment has been issued (Yes in step S118), the control section 30 terminates the process.

On the other hand, when a result of the evaluation shows that no instruction to terminate the alignment adjustment has been issued (No in step S118), the control section 30 returns to step S116 and performs the each-point adjustment again.

After the process described above is completed, the control section 30 stores the correction information in the storage section 40 <storage step>. Thereafter, when image data is inputted to any of the image input terminals 20, the projector 10 reads the stored correction information, corrects color misregistration in the image based on the read correction information, and projects the corrected image on the screen SC. The stored correction information is maintained until the alignment adjustment process is carried out next time.

According to the embodiment described above, the following advantageous effect is provided.

(1) To perform the alignment adjustment in a case where position misregistration is complicated, the entire adjustment function of shifting the adjustment pattern image 70B as a whole is first used to translate the adjustment pattern image 70B to be shifted to suppress a recognizably large amount of position misregistration, and the four-point adjustment or the each-point adjustment can then be used to suppress a small amount of position misregistration due to inclination of a pattern and a difference in size thereof, whereby effort and time required for the alignment adjustment can be reduced.

The invention has been described with reference to the illustrated embodiment, but the invention is not limited to the present embodiment, and the following variations are conceivable.

(1) The shiftable amount of an intersection to be shifted in accordance with a shift instruction is limited to a maximum value. Therefore, when part of the intersections have already been shifted as targets to be adjusted in the each-point adjustment by a predetermined amount, it is conceivable that when the entire adjustment shifts all the intersections as a whole, the amount of shift of the part of the intersections reaches the maximum value. In this case, two aspects are conceivable. In one aspect, when the amount of shift of any of the intersections reaches the maximum value, the shift as a whole in the entire adjustment may not be allowed any more. In the other aspect, after the amount of shift of an intersection reaches the maximum value in the entire adjustment, the intersection is not allowed to be shifted any more, but only the other intersections, the amounts of shift of which have not reached the maximum value, may be allowed to be shifted as a whole.

(2) When the lens shift adjustment section 48 shifts the projection lens 60, it is conceivable that the positions of projected color images are shifted from one another because the refractive index of the lens varies depending on the wavelength. In this case, the alignment is completed only by the entire adjustment in many cases. Automatic alignment that does not require user's operation may therefore be achieved as follows: The lens shift adjustment section 48 is configured to output a signal according to the amount of lens shift; the amount of shift in the entire adjustment is calculated in accordance with the signal; and a target adjustment pattern image 70 is shifted based on the calculated amount of shift.

The approach described above is performed by a single apparatus in some cases and by a combination of a plurality of apparatus in other cases, that is, an apparatus that achieves the approach have a variety of configurations.

The configurations and combinations thereof in the embodiment are presented by way of examples, and addition of a configuration, and omission, substitution, and other changes of any of the configurations described above can be made to the extent that the changes do not depart from the substance of the invention. Further, the invention is not limited by the embodiment but is limited only by the appended claims.

What is claimed is:

1. A projector comprising:
   a light source section that outputs light;
   a first light modulation section that modulates first color component light out of the light outputted from the light source section based on a first image signal;
   a second light modulation section that modulates second color component light out of the light outputted from the light source section based on a second image signal;
   a projection section that projects a first image corresponding to the light modulated by the first light modulation section and a second image corresponding to the light modulated by the second light modulation section;
   a display control section that superimposes the first image and the second image on each other and projects a superimposed image to show position misregistration of the second image relative to the first image;
   an accepting section that accepts shift instruction to shift the second image relative to the first image; and
   an alignment adjustment section that determines correction information for correcting the position misregistration based on the shift instruction accepted by the accepting section and corrects the second image signal based on the determined correction information,
   wherein the accepting section accepts the shift instruction via a first instruction input screen for shifting the second image as a whole and a second instruction input screen for shifting a predetermined portion of the second image.

2. The projector according to claim 1,
   wherein the accepting section accepts the shift instruction issued via the first instruction input screen before the shift instruction issued via the second instruction input screen.

3. The projector according to claim 1,
   wherein when the accepting section accepts the shift instruction via the first instruction input screen, the alignment adjustment section shifts the second image by the same amount of shift in accordance with the shift instruction or offsets data on the second image in accordance with the shift instruction and reads the offset data.

4. The projector according to claim 1,
   wherein the second instruction input screen accepts at least one of the shift instruction to shift a plurality of end portions of the second image and the shift instruction to shift an arbitrary portion of the second image.

5. A method for adjusting a projector including a light source section, a first light modulation section that modulates first color component light out of light outputted from the light source section based on a first image signal, a second light modulation section that modulates second color component light out of the light outputted from the light source section based on a second image signal, and a projection section that projects a first image corresponding to the light modulated by the first light modulation section and a second image corresponding to the light modulated by the second light modulation section, the method comprising:
   superimposing the first image and the second image on each other and projecting a superimposed image to show position misregistration of the second image relative to the first image;
   accepting a first shift instruction via a first instruction input screen for shifting the second image as a whole relative to the first image;

accepting a second shift instruction via a second instruction input screen for shifting a predetermined portion of the second image; and determining correction information for correcting the position misregistration based on the first shift instruction and the second shift instruction and storing the determining correction information.

6. The method for adjusting a projector according to claim 5, wherein the accepting of the first shift instruction via the first instruction input screen is executed before the accepting of the second shift instruction via the second instruction input screen.

* * * * *